(12) United States Patent
Mopur et al.

(10) Patent No.: US 9,065,740 B2
(45) Date of Patent: Jun. 23, 2015

(54) PRIORITISING DATA PROCESSING OPERATIONS

(75) Inventors: Satish Kumar Mopur, Karnataka (IN); Parthasarathi Ilangovan, Bangalore Karnataka (IN); Narayanan Ananthakrishnan Nellayi, Bangalore Karnataka (IN); Unnikrishnan Ponnan Katangot, Karnataka (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 1639 days.

(21) Appl. No.: 12/198,801

(22) Filed: Aug. 26, 2008

(65) Prior Publication Data

US 2009/0063716 A1  Mar. 5, 2009

(30) Foreign Application Priority Data

Aug. 27, 2007 (IN) .......................... 1917/CHE/2007

(51) Int. Cl.
*G06F 13/18* (2006.01)
*H04L 12/801* (2013.01)
*G06F 3/06* (2006.01)

(52) U.S. Cl.
CPC ............... *H04L 47/10* (2013.01); *G06F 3/0611* (2013.01); *G06F 3/0659* (2013.01); *G06F 3/067* (2013.01)

(58) Field of Classification Search
CPC ........ G06F 3/0611; G06F 3/067; G06F 3/0659
USPC .............................................................. 710/6
See application file for complete search history.

(56) References Cited

U.S. PATENT DOCUMENTS

| 7,594,002 B1* | 9/2009 | Thorpe et al. ................. 709/219 |
| 2003/0051016 A1* | 3/2003 | Miyoshi et al. ............... 709/222 |
| 2004/0034683 A1* | 2/2004 | Zhao ............................. 709/201 |
| 2008/0126652 A1* | 5/2008 | Vembu et al. ................. 710/268 |

* cited by examiner

*Primary Examiner* — Henry Tsai
*Assistant Examiner* — John Roche
(74) *Attorney, Agent, or Firm* — Trop, Pruner & Hu, P.C.

(57) ABSTRACT

The invention relates to a system and method for prioritizing one or more data processing operations in a computer storage system, the computer storage system including a plurality of modules, the method comprising receiving a command indicating one or more data processing operations to which priority is to be assigned and interfacing with each of the modules so as to prioritize the one or more data processing operations over other data processing operations.

14 Claims, 7 Drawing Sheets

PRIORITISING DATA PROCESSING OPERATIONS

RELATED APPLICATIONS

This patent application claims priority to Indian patent application serial number 1917/CHE/2007, having title "Prioritising Data Processing Operations", filed on 27 Aug. 2007 in India (IN), commonly assigned herewith, and hereby incorporated by reference.

BACKGROUND OF THE INVENTION

The increasing use of applications with significant data throughput requirements, such as online transaction processing applications, combined with the increasing use of file servers and rich media data servers, has led to an input/output (I/O) intensive application space which demands fast processing of large volumes of data. Such I/O intensive environments can have large, sustained workloads involving a wide range of I/O data transfer sizes as well as periodic burst accesses, depending on the applications involved.

When applications which are executing in parallel demand fast processing, an acceptable level of performance on a per application basis becomes a major customer requirement. Even in systems with resources such as large memory, multiple CPUs and associated resource management utilities, I/O subsystem bottlenecks may exist because the I/O system as a whole may not be configured to run optimally. Furthermore, applications for which I/O operations are critical, such as online transaction processing, currently compete equally for resources with applications for which I/O is non-critical, negatively impacting the critical application's requirements.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
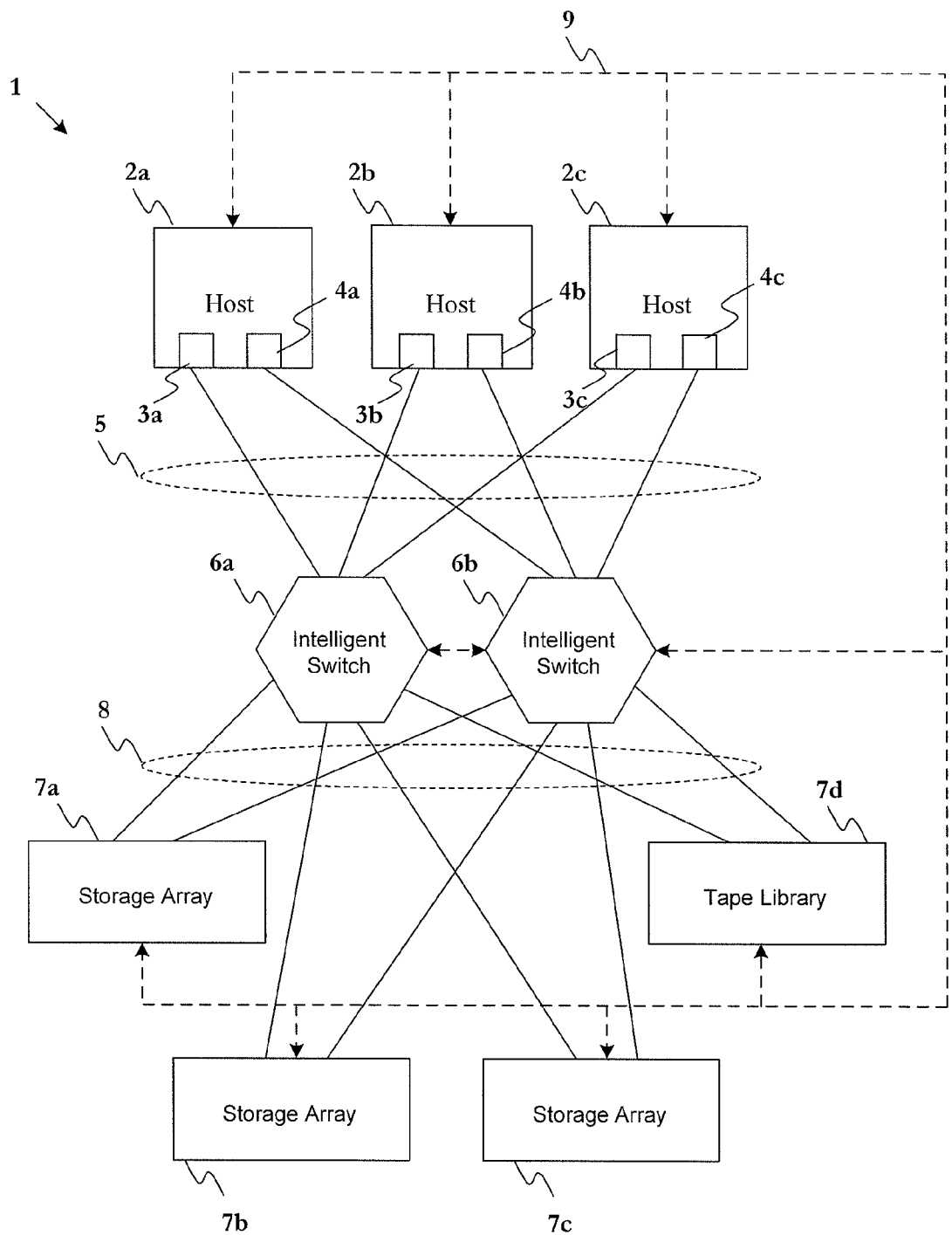
FIG. 1 illustrates a storage area network according to an embodiment of the present invention.

Referring to FIG. 1, a storage area network (SAN) 1 includes a plurality of hosts 2a, 2b, 2c, each having two host bus adaptors (HBAs) 3a, 4a, 3b, 4b, 3c, 4c connected via a plurality of first data links 5 to a plurality of intelligent switches 6a, 6b. The intelligent switches 6a, 6b route data between the hosts 2a, 2b, 2c and a plurality of storage elements 7a-d connected to the intelligent switches 6a, 6b via a plurality of second data links 8. The plurality of hosts 2a-c are, in the present example, servers, although they may alternatively be client computers. The storage elements 7a-7c comprise disk drive arrays 7a, 7b, 7c and a tape library 7d. The first and second data links 5, 8 between the hosts 2a-c, intelligent switches 6a, 6b and storage arrays 7a-d are, in the present example, fibre channel connections, but can alternatively be other connections such as ethernet connections, SCSI (Small computer System Interface) interfaces or TCP/IP connections, as known to those skilled in the art. The network of HBAs 3a-3c, 4a-4c, data-links 5, 8, and switches 6a, 6b that connect the hosts 2a-2c and the storage elements 7a-7d make up what is known as the fabric of the storage area network 1.

A third data link 9 is provided between the hosts 2a-c, switches 6a, 6b and storage arrays 7a-d, and is used to carry storage network stack resource control data according to the present invention, as will be described in more detail below. The third data link 9 in the present example comprises a TCP/IP data link, although the fibre channel connections 5, 8 can alternatively be used, or alternative connections known to those skilled in the art.

Each host 2a, 2b, 2c, is allocated a storage area which can be accessed through the fabric of the SAN 1. The storage area may be distributed over different storage elements 7a-7d. A LUN or Logical Unit Number (also referred to as Logical Unit i.e. LU), corresponds to an actual or virtual portion of a storage element. For example, a LUN may correspond to one or more disks in a disk drive array.

The hosts 2a-2c may be connected in a local area network (LAN) to a number of client computers (not shown). The client computers may be directly connected to the SAN 1 with their own data links, such as fibre channel links, or indirectly connected via the LAN and the hosts 2a-2c.

Figure 2:
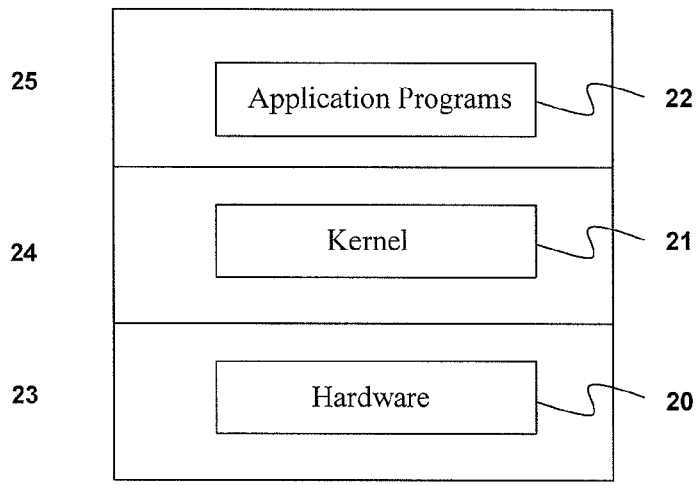
FIG. 2 is a high-level overview of a processing system.

FIG. 2 is a high-level overview of a processing system, such as those operating on the hosts 2a-2c, illustrating the inter-relationship between software and hardware. The system includes hardware 20, a kernel 21 and application programs 22. The hardware is referred to as being at the hardware level 23 of the system. The kernel 21 is referred to as being at the kernel level or kernel space 24 and is the part of the operating system that controls the hardware 20. The application programs 22 running on the processing system are referred to as being at a user level or user space 25.

Figure 3:
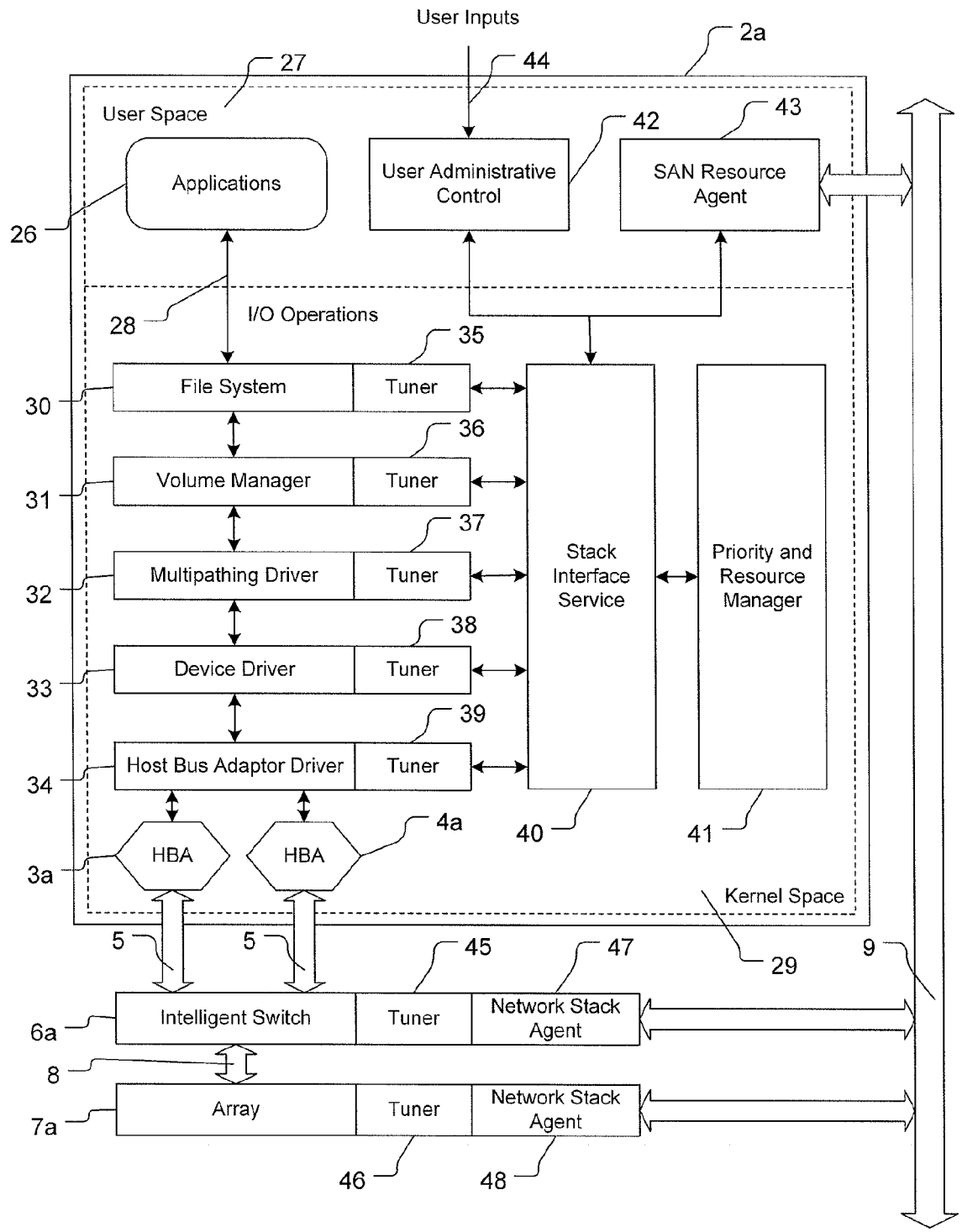
FIG. 3 illustrates the configuration of a host, intelligent switch and storage device of the storage area network of FIG. 1 in more detail.

FIG. 3 illustrates the host 2a, intelligent switch 6a and storage array 7a of FIG. 1 in more detail. The host 2a runs the HP UX™ operating system and includes a number of applications 26 operating in user space 27, the applications generating I/O operation requests 28 to be processed in kernel space 29. The kernel space 29 includes a file system 30, volume manager 31, multipathing driver 32, device driver 33, in the present example a SCSI device driver, and host bus adaptor driver 34, each forming a layer of what is referred to as the host storage software stack. Other layers are possible in addition to or in place of the layers illustrated in FIG. 3, for instance a filter driver or a device driver above or below any of these layers performing specialised operations, or specific to a mass storage protocol such as iSCSI. Also, a fibre channel driver and/or an Infiniband driver could form part of the host storage software stack.

The kernel space 29 also includes the HBAs 3a, 4a of the host 2a, which are controlled by the host bus adaptor driver 34 and connect to data link 5 linking the host 2a to the intelligent switch 6a and, in turn, via data link 8 to storage array 7a.

Each of the layers of the host storage software stack has a respective tuner module 35-39 arranged to support tuning of the layer for prioritisation control. The tuners interface with a stack interface service (SIS) 40 implemented as a pseudo driver module in kernel space 29. The stack interface service 40 receives commands from a priority and resource manager 41, also implemented as a pseudo driver module in kernel space 29. The stack interface service 40 is arranged to receive data from a user administrative control application 42 running in user space 27 and from a SAN resource agent 43. The user administrative control application 42 receives user inputs 44 via a user input interface which could be a command line interface or a graphical user interface.

The intelligent switch 6a and the storage array 7a are referred to as layers of the network storage software stack and are also each provided with a respective tuner 45, 46 arranged to support tuning of their resources for prioritisation control. The network stack layers 6a, 7a are also provided with a respective network stack agent 47, 48, which interfaces with the tuner 45, 46. The SAN resource agent 43 is configured as a daemon process running in user space 27 and is used to interface with the network stack agents 47, 48 of the SAN components via the third data link 9.

Figure 4:
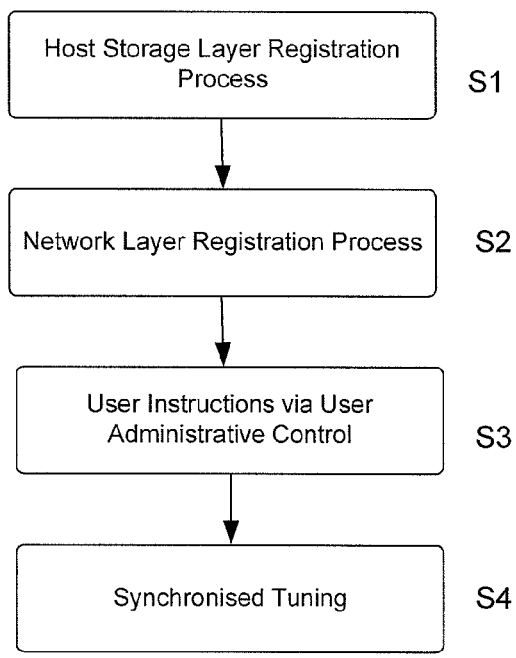
FIG. 4 is a flow diagram illustrating the process of resource tuning for prioritisation according to an embodiment of the present invention.

FIG. 4 is a flow diagram illustrating the process of resource tuning for prioritisation at the host 2a, intelligent switch 6a and storage array 7a illustrated in FIGS. 1 and 3.

In a first stage in the process, the layers 30-34 of the host storage software stack register with the stack interface service 40 (step S1).

Figure 5:
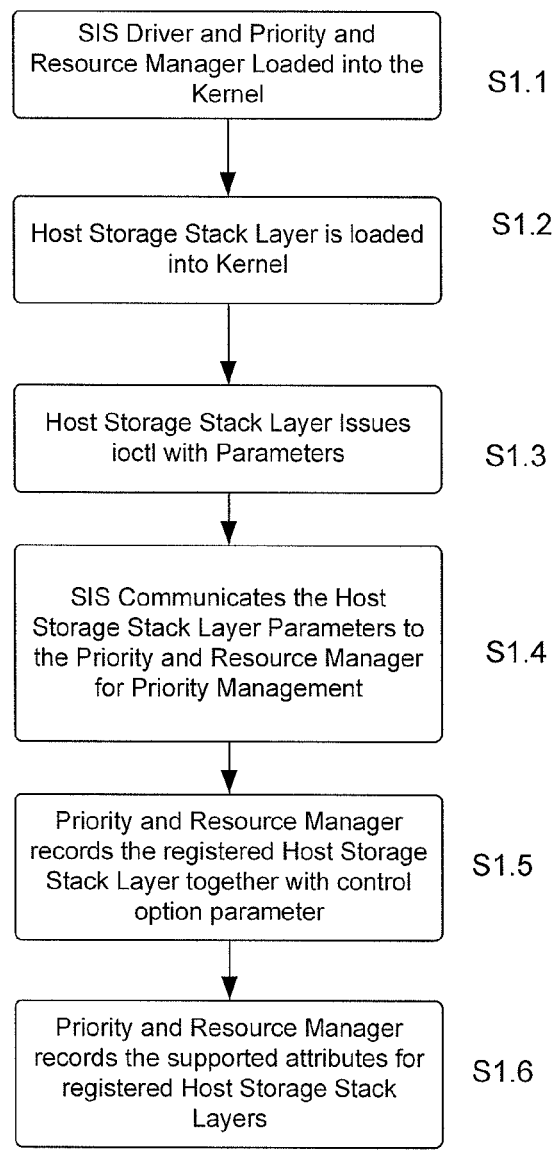
FIG. 5 is a flow diagram illustrating a host storage stack layer registration process according to an embodiment of the invention.

FIG. 5 illustrates the steps involved in the registration of each of the host storage stack layers 30-34. The SIS driver 40 is loaded into the kernel 29 along with the priority and resource manager 41 (step S1.1). The individual layer 30-34 is then loaded into the kernel 29 (step S1.2). When a layer is loaded in the kernel, this layer will register with the SIS 40 using an ioctl interface (step 1.3). In particular, the storage layer issues an ioctl call to the driver 40 having the following parameters:

```
ioctl    (Device Descriptor,
         Stack Identification No.,
         Control Option,
         Supported Attributes,
         Tuning Function Pointer (Function Parameters)
         )
```

The definitions of the storage layer ioctl parameters are set out below in table 1.0.

TABLE 1.0

| No. | Parameter | Definition |
| --- | --- | --- |
| 1 | Device Descriptor | Stack interface service driver descriptor |
| 2 | Stack Identification No. | Indicates the layer that is registering with the SIS driver |
| 3 | Control Option | Indicates to the SIS driver whether the layer opts in or out of resource control |
| 4 | Supported Attributes | The attributes which this tuner can support, for instance application id/process id, I/O type, I/O request size, storage device or LUN |
| 5 | Tuning Function Pointer | A function pointer supplied by the stack layer for tuning control. |

Each host storage stack layer therefore indicates, via the ioctl call, whether or not it can control its resources so as to prioritise I/O operations based on attributes such as a particular application or process identification number, an input/output type or request size or an end LUN. The 'control option' parameter is used to specify whether the layer opts in or out of resource control in general and the 'supported attributes' parameter is used to specify the particular attribute (s) of I/O operations that the layer can support for prioritisation. The tuning function pointer is used to control the tuning of the layer for resource prioritisation when required.

The stack interface service 40 communicates the ioctl call parameters received from each stack layer to the priority and resource manager 41 using a function call exposed by the priority and resource manager 41 to the SIS 40 (step S1.4).

The priority and resource manager 41 records the host storage stack layers that register, together with an indication as to whether they have opted for resource control via the 'control option' parameter (step 1.5) and, if so, records the attributes that can be controlled, as specified in the 'supported attributes' parameter (step S1.6).

Referring again to FIG. 4, following the host registration process, a network stack layer registration process is performed (step S2).

Figure 6:
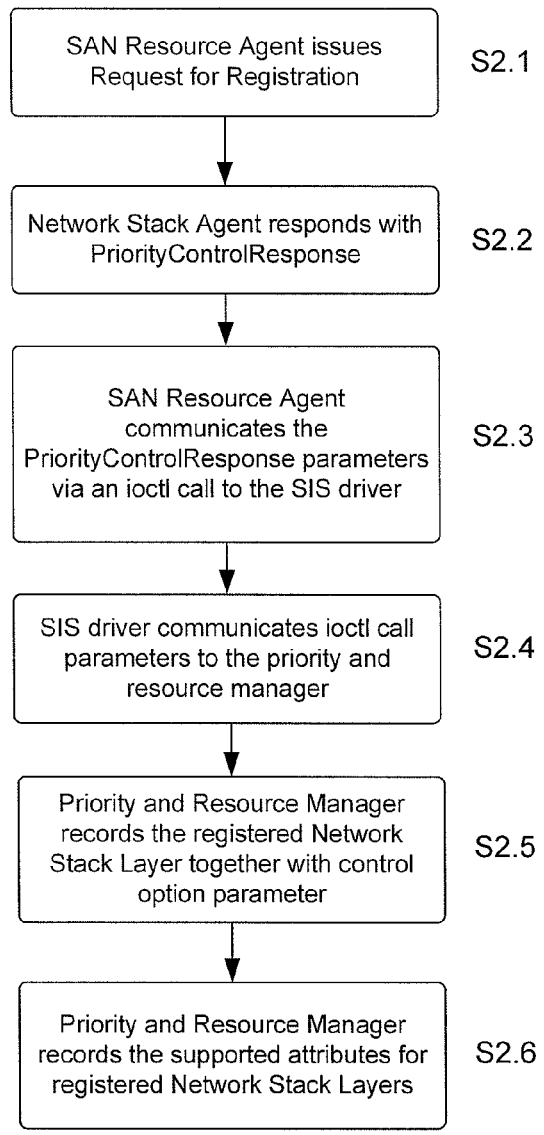
FIG. 6 is a flow diagram illustrating a network storage stack layer registration process according to an embodiment of the invention.

FIG. 6 illustrates the network stack layer registration process. The SAN resource agent 43 issues a request for registration to the network stack agent 47, 48 of each network stack layer 6a, 7a (step S2.1). The network stack agent 47, 48 of each layer responds with a PriorityControlResponse indicating that registration is complete (step S2.2).

The PriorityControlResponse returned to the SAN resource agent 43 includes a header, stack identification number, control option and supported attributes, as defined in table 2.0 below.

TABLE 2.0

| No. | Parameter | Definition |
| --- | --- | --- |
| 1 | Header | Indicates to the stack interface service that this is a network stack response |
| 2 | Stack Identification No. | Indicates the layer that is registering with the SIS driver (intelligent switch, storage array etc) |
| 3 | Control Option | Indicates to the SIS driver whether the layer opts in or out of resource control |
| 4 | Supported Attributes | The attributes which this tuner can support, for instance a storage device, end LUN, or an array controller port |

The SAN resource agent 43 receives the PriorityControlResponse and communicates the data received in the response to the stack interface service 40 via an ioctl call (step S2.3). The parameters in the ioctl call between the SAN resource agent 43 and the stack interface service 40 are parameter numbers 1 to 4 listed in table 1.0, namely the device descriptor, stack identification number, control option and supported attributes, where the stack identification number, control option and supported attributes are taken from the PriorityControlResponse.

The stack interface service 40 communicates the ioctl parameters to the priority and resource manager 41 (step S2.4) using a function call exposed by the priority and resource manager 41 to the SIS 40. The priority and resource manager 41 records the network stack layers that register, together with an indication as to whether they have opted for resource control via the 'control option' parameter (step S2.5) and, if so, records the attributes that can be controlled, as specified in the 'supported attributes' parameter (step S2.6).

Referring to FIG. 4, once the SAN stack layer registration process (S2) is complete, user instructions can be received via the user administrative control module 42 (step S3).

Via the user administrative control module 42, users, for instance system administrators, can select tuning of the resources of the host and network stack layers according to a number of factors. For instance, the user can specify tuning to prioritise the resources based on the attributes of I/O operations to be processed, such as the I/O type, for instance read or write, the I/O operation size, for instance greater or less than 4 Kb, 8 Kb, 16 Kb etc, the end LUN, an application name or a process identification number. The user can also specify a validity period for which the priority request is required and a quantity indicating the proportion of the resource which is to be allocated to the prioritised I/O operation, for instance allocated as a percentage.

Figure 7:
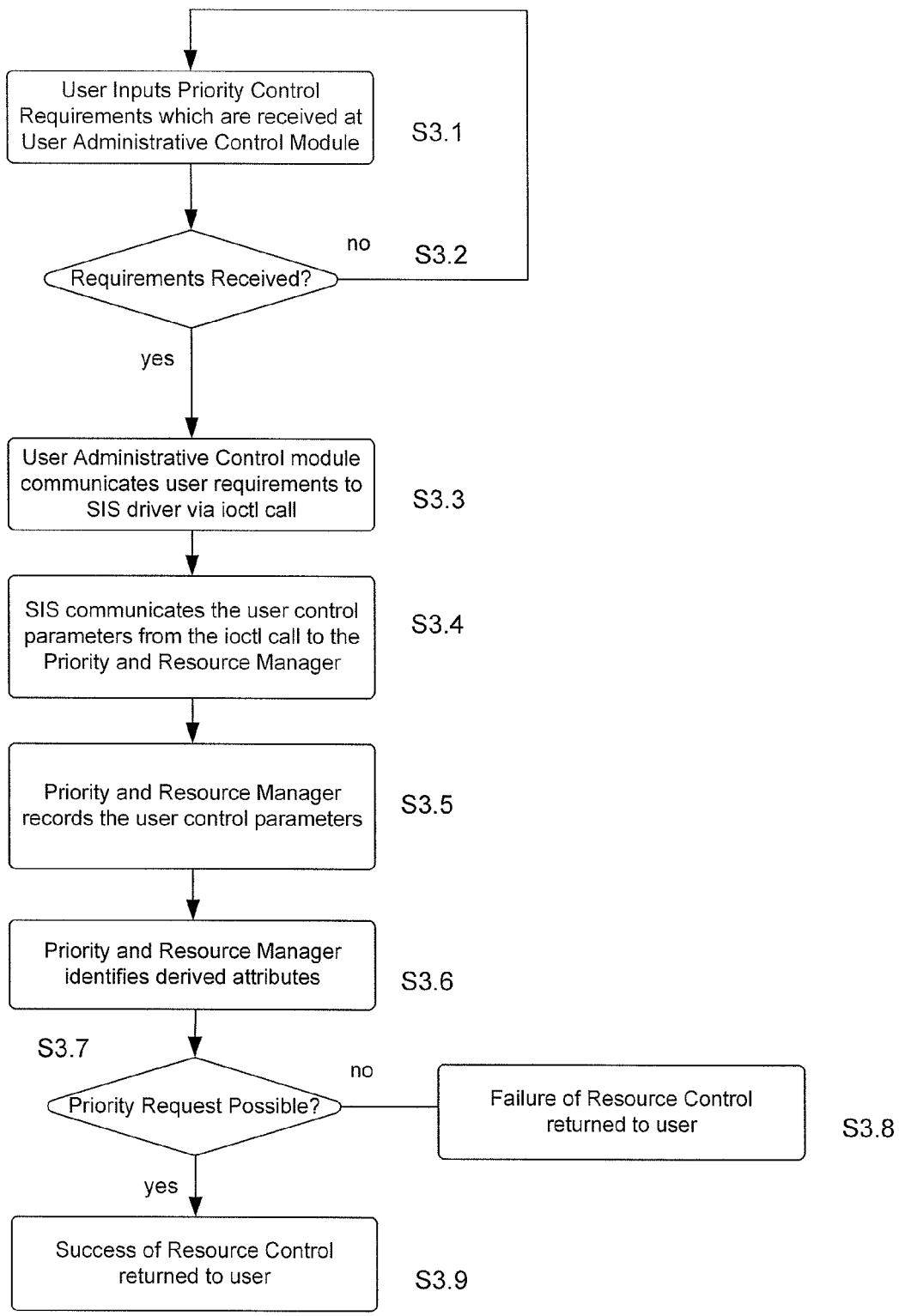
FIG. 7 is a flow diagram illustrating the steps performed in processing user prioritisation instructions according to an embodiment of the invention.

FIG. 7 illustrates the steps performed in processing user instructions.

User requirements for prioritisation control are received as user inputs 44, via an input device such as a keyboard or mouse (not shown), at the user administrative control module 42 (step S3.1). Once the user administrative control module 42 determines that user requirements have been received (step S3.2) it communicates the requirements to the stack interface service driver via an ioctl call (step S3.3) of the form:

```
ioctl  (Device Descriptor,
        Command,
        Attribute type,
        Attribute value,
        Validity period,
        Resource quantity
       )
```

The definition of the parameters of the ioctl call between the user administrative control module and the stack interface service module are set out in table 3.0 below.

TABLE 3.0

| No. | Parameter | Definition |
|---|---|---|
| 1 | Device Descriptor | SIS driver descriptor |
| 2 | Command | Indicates to the SIS whether the user wants priority to be turned on or off |
| 3 | Attribute type | The attribute type to be prioritised |
| 4 | Attribute value | The value for the attribute type |
| 5 | Validity period | The duration for which the priority request is valid |
| 6 | Resource quantity | The percentage of the resource which is to be allocated for prioritisation |

The stack interface service 40 communicates the user control parameters it receives in the ioctl call to the priority and resource manager 41 (step S3.4) using a function call exposed by the priority and resource manager 41 to the SIS 40. The priority and resource manager 41 records the user control parameters (step S3.5) and identifies any derived values from the parameters (step S3.6). For instance, an end primary attribute such as an end LUN would result in a derived attribute of the port of an array controller which is associated with the end LUN. The priority resource manager 41 then determines (step S3.7) whether priority control according to the user request is possible and returns an indication to the user via the stack interface service 40 and user administrative control module 42 that the request has either failed (step S3.8) or has been successful (step S3.9).

Referring to FIG. 4, once the user instructions have been received and processed, and in the case that the user request is successful (step S3.9), synchronised tuning of the resources of the host and network stack layers can be performed (step S4).

Figure 8:
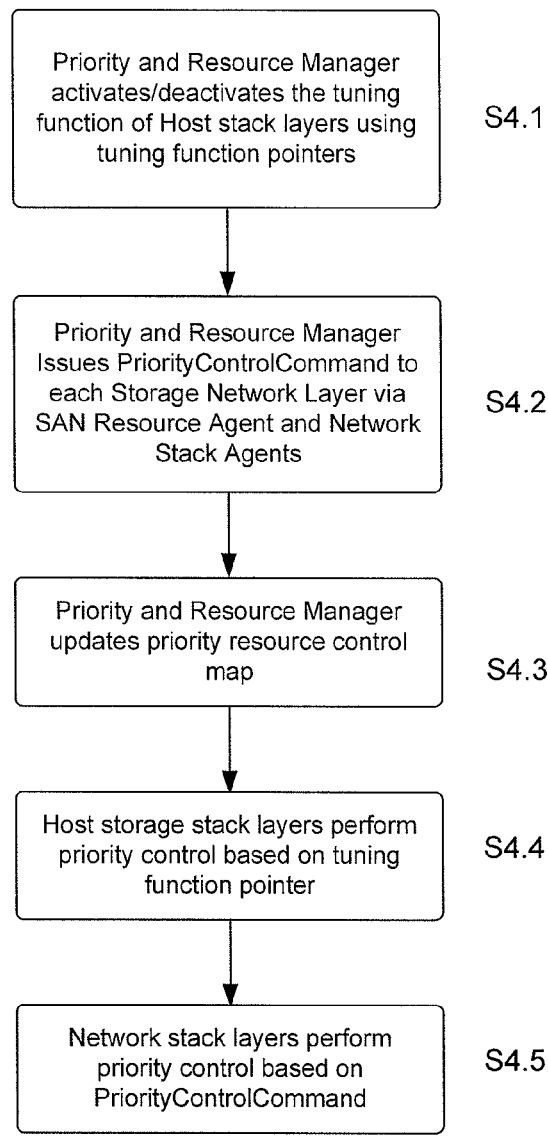
FIG. 8 is a flow diagram illustrating the steps performed in synchronised tuning of the host and network stack layers according to an embodiment of the invention.

FIG. 8 illustrates the steps performed in synchronised tuning of the host and network stack layers.

Referring to FIG. 8, the priority and resource manager 41 activates or deactivates the tuning function of the host storage stack layers that have registered for resource control by setting the value of the tuning function pointer provided in the ioctl call of each host storage stack layer accordingly, so as to implement the desired prioritisation (step S4.1). The priority and resource manager 41 also issues a PriorityControlCommand to each registered layer of the network stack, via the SAN resource agent and the respective network stack agents (step S4.2).

The PriorityControlCommand has the parameters set out in table 4.0 below.

TABLE 4.0

| No. | Parameter | Definition |
|---|---|---|
| 1 | Header | Indicates the destination stack layer |
| 2 | Control | Tuner on or off |
| 3 | Attribute type | For instance, whether based on array controller port or end LUN |
| 4 | Attribute value | Value of the specified attribute type |

The priority and resource manager 41 then updates a priority resource control map that it stores which associates user needs with stack tuner support allocations, and links the associated host and/or network stack layers that are supporting each priority request (step S4.3). A typical resource control map would have the values set out in table 5.0 below.

TABLE 5.0

| Layer Id | Tuner function/request | Attribute Specified | Attributes Supported | % | Validity Period |
|---|---|---|---|---|---|
| File System | FS_ResourceControlFunction | Application Id, end LUN | Application Id | 50% | 60 minutes |
| HBA I/F driver | HBA_IF_ResourceControlFunction | End LUN | End LUN | 50% | 60 minutes |
| Storage Array | ARRAY_ResourceControlRequest | End LUN | End LUN | 50% | 60 minutes |

Meanwhile, the host and network stack layers implement the priority control based on their received user requirements (steps S4.4 and S4.5). Prioritisation of I/O throughput is accordingly implemented across the storage software layers of a computer storage system in a synchronised manner, based on user attribute requirements.

In an example of the present invention, three applications A1, A2 and A3 operate in the user space 27. A1 uses a logic unit number LUN1 for read operations and A2 uses the logic unit number LUN1 for write operations. A3 uses LUN2 for both read and write operations. The user could, for instance, specify:
Attribute types: Application ID, I/O type, end LUN
Attribute value: A1, Reads, LUN1

The resulting priority resource allocation would accordingly be 100% of the file system resources allocated to A1 and 100% of the driver resources for I/O operations to LUN1 for reads only.

Alternatively, the user could specify:
Attribute types: Application ID, end LUN
Attribute value: A1, LUN1

The resulting priority resource allocation would accordingly be 100% of the file system resources allocated to A1 and 50% of the driver resources for I/O operations to A1 and A2 (since both access LUN1). Net priority for A1 will therefore be 100% of the file system resources and 50% of the driver resources.

In the case that a user choice is incorrectly specified, for instance in the case that an impossible combination is specified such as A1 with attributes I/O type and end LUN and values 'writes' and 'LUN2', the priority and resource manager 41 observes read and write patterns to end LUNs from A1 and highlights the possibility of an anomaly to the user.

Current work load managers, such as the HPUX™ process resource manager support specific CPU/Memory and Disk I/O bandwidth prioritisation localised to one layer of the storage software stack. The user administrative control module 42 according to embodiments of the present invention is arranged to expose an application programmable interface (API) for priority attribute specification to enable tuning control by work load managers. This can enable the prioritisation infrastructure of the present invention to interact with existing work load managers in conjunction with CPU/Memory allocations so that prioritisation clashes do not occur.

The user administrative control module 42 also indicates to users that manually tuning layers of the host and/or network stack from user space can override the tuning performed by the prioritisation infrastructure of the present invention or may be overridden by the prioritisation infrastructure of the present invention.

The priority and resource manager 41, according to embodiments of the invention, is arranged to control each of the layers in the host stack and network. Each layer, in turn, controls and assigns its internal resources based on their availability and controllability to that layer for priority support. For example, in the host stack the multipathing layer 32 can be controlled by detecting the turn around time of data being routed and choosing paths with the shortest turn-around time for allocation to prioritised applications. The paths allocated to prioritised I/O operations will therefore be dynamic in nature, as determined by the multipathing layer. Considering another example, in the network stack, the tuner 45 in the intelligent switch 6a is, in certain embodiments, arranged to monitor slow response paths and to take the decision to reroute prioritised I/O operations appropriately to less loaded paths. Similarly, the array tuner 46 can also allocate more I/O command processing resources to a LUN used by high priority applications, or assign ownership of a LUN to a controller which is loaded less that other controllers. In all of the examples above, resource control is dependent on the capabilities of that layer, as would be appreciated by those skilled in the art.

Whilst specific examples of the host and network layer registration processes have been provided, the invention is not limited to these examples. For example, the SIS driver module 40 and priority and resource manager 41 need not be loaded prior to the layers 30 to 34, 6a, 7a, of the host and network stacks, but can be loaded afterwards. The SIS driver module 40 can, in this case, be configured to trigger the layers to register through a further ioctl interface. Other arrangements are also possible, as would be apparent to those skilled in the art.

Also, whilst the invention has been described with regards to implementing resource prioritisation on host 2a, intelligent switch 6a and storage array 7a of FIG. 1, the invention can also be applied to the resources of other combinations of hosts 2a, 2b, 2c, intelligent switches 6a, 6b and storage elements 7a, 7b, 7c, 7d.

The present invention may be implemented as computer program code stored on a computer readable medium. Furthermore, whilst the invention has been described based on a Unix-based operating system, namely HPUX™, it can also be applied for other operating systems, the implementations of which would be apparent to the skilled person from the present disclosure.

The invention claimed is:

1. A method of prioritising an input/output (I/O) operation in a computer storage system, the computer storage system including a host computing device having a host storage software stack at a kernel level of a host operating system, the host storage software stack including a plurality of software layers, the method comprising:
receiving a command indicating one or more I/O operations to which priority is to be assigned; and
interfacing with each of the software layers of the host storage software stack at the kernel level of the host operating system so as to prioritise allocation of resources of the software layers to the one or more I/O operations, based on the received command, wherein the prioritization is performed synchronously across the software layers.

2. A method according to claim 1, wherein the command indicates the one or more I/O operations to which priority is to be assigned based on at least one attribute of the I/O operations.

3. A method according to claim 2, wherein the at least one attribute identifies an application, process or device relating to the one or more I/O operations.

4. A method according to claim 2, wherein the at least one attribute comprises one or more of an application identification number, a process identification number, an indication that the I/O operation is a read operation, an indication that the I/O operation is a write operation, the size of an I/O operation, an indication of a storage device relating to an I/O operation or a logical unit number LUN associated with a storage device relating to an I/O operation.

5. A method according to claim 2, further comprising processing the at least one attribute and providing an indication as to the validity of the at least one attribute.

6. A method according to claim 5, wherein the indication as to the validity of the at least one attribute indicates that the at least one attribute is an anomaly.

7. A method according to claim 1, wherein the computer storage system further comprises a network storage stack having a plurality of network layers, and wherein the method further comprises interfacing with each of the network layers to prioritise allocation of resources of the network layers to the one or more I/O operations.

8. A method according to claim 1, further comprising registering each of the software layers in a registration procedure, wherein the registration procedure includes providing an indication from each software layer that identifies whether or not one or more resources of the software layer are available for prioritized allocation.

9. A method according to claim 8, wherein the registration procedure further comprises receiving parameters from each of the software layers indicating properties of I/O operations based on which data processing operations can be prioritised by the software layer.

10. A method according to claim 1, wherein the software layers comprise at least one of a file system, a volume manager, a device driver, a multipathing driver and a host bus adapter driver.

11. A method according to claim 7, wherein the layers of the network storage stack comprise at least one of an intelligent switch, a storage array, a tape library and an in-band appliance.

12. A method according to claim 1, wherein the software layers each comprise one or more resources which can be utilised to prioritise the one or more I/O operations and wherein the step of interfacing with each of the software layers is performed irrespective of the resource.

13. A method according to claim 12, wherein the software layers each control their respective resources based on the capability and/or availability of the resource to prioritise the one or more I/O operations.

14. A non-transitory computer readable medium storing program code for implementing a system for prioritising an input/output (I/O) operation in a computer storage system having a host computing device having a host storage software stack at a kernel level of a host operating system, the host storage software stack including a plurality of software layers, the program code comprising:
  first program instructions which, when executed, provide a utility for receiving a command indicating one or more I/O operations to which priority is to be assigned; and
  second program instructions which, when executed, provide an interface with each of the software layers of the host storage software stack at the kernel level of the host operating system for prioritizing allocation of resources of the software layers to the one or more I/O operations, wherein the prioritization is performed synchronously across the software layers.

* * * * *

UNITED STATES PATENT AND TRADEMARK OFFICE
CERTIFICATE OF CORRECTION

PATENT NO.        : 9,065,740 B2
APPLICATION NO.   : 12/198801
DATED             : June 23, 2015
INVENTOR(S)       : Satish Kumar Mopur et al.

Page 1 of 1

It is certified that error appears in the above-identified patent and that said Letters Patent is hereby corrected as shown below:

On the Title page, in Item (75), Inventors, in column 1, line 3, delete "Kamataka" and insert
-- Karnataka --, therefor.

Signed and Sealed this
Third Day of November, 2015

Michelle K. Lee
*Director of the United States Patent and Trademark Office*